(12) United States Patent
Awan et al.

(10) Patent No.: US 6,792,293 B1
(45) Date of Patent: Sep. 14, 2004

(54) APPARATUS AND METHOD FOR ORIENTING AN IMAGE ON A DISPLAY OF A WIRELESS COMMUNICATION DEVICE

(75) Inventors: Karamat Awan, Chicago, IL (US); Steve Smith, Evanston, IL (US); Carl Gottfried Kammer, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 315 days.

(21) Appl. No.: 09/660,612

(22) Filed: Sep. 13, 2000

(51) Int. Cl.[7] ................................................ H04M 1/00
(52) U.S. Cl. .................... 455/566; 455/567; 455/575.3; 379/433.04
(58) Field of Search ................................. 455/566, 556, 455/567, 90, 575, 90.3, 575.3; 348/14.07, 52; 379/433.04, 433.01

(56) References Cited

U.S. PATENT DOCUMENTS

| | | | |
|---|---|---|---|
| 4,534,063 A | | 8/1985 | Krumin et al. |
| 4,802,241 A | | 1/1989 | Vickers et al. |
| 4,817,194 A | | 3/1989 | Andros, Jr. |
| 5,014,046 A | * | 5/1991 | Minami ...................... 340/727 |
| 5,398,023 A | | 3/1995 | Murray |
| 5,442,453 A | | 8/1995 | Takagi et al. |
| 5,559,554 A | | 9/1996 | Uekane et al. |
| 5,642,102 A | * | 6/1997 | Panther et al. ......... 340/825.44 |
| 5,896,575 A | * | 4/1999 | Higginbotham et al. .... 455/566 |
| 5,901,222 A | * | 5/1999 | Macor ........................ 379/433 |
| 5,940,076 A | | 8/1999 | Sommers et al. |
| 5,986,634 A | | 11/1999 | Alioshin et al. |
| 6,069,648 A | | 5/2000 | Suso et al. |
| 6,085,112 A | * | 7/2000 | Kleinschmidt et al. ...... 455/556 |
| 6,134,453 A | * | 10/2000 | Sainton et al. .............. 455/553 |
| 6,275,714 B1 | * | 8/2001 | Kintz et al. ................. 455/566 |
| 6,327,482 B1 | * | 12/2001 | Miyashita ................... 455/566 |
| 6,466,202 B1 | * | 10/2002 | Suso et al. .................. 345/169 |
| 6,542,721 B2 | * | 4/2003 | Boesen ........................ 455/90 |

FOREIGN PATENT DOCUMENTS

| | | | | |
|---|---|---|---|---|
| GB | 2328343 | * | 2/1999 | ............ H04M/1/02 |
| GB | 2343324 | * | 5/2000 | ............ H04M/1/02 |
| JP | 9-46745 | * | 2/1997 | ............ H04Q/7/14 |
| WO | WO 99/59312 | * | 11/1999 | ............ H04M/1/00 |

* cited by examiner

*Primary Examiner*—Duc M. Nguyen
(74) *Attorney, Agent, or Firm*—Hisashi D. Watanabe

(57) ABSTRACT

This invention is an apparatus and method for orienting an image (402, 404) on a display (116) of a wireless communication device (100). The device includes a housing (102) for supporting the display and an electronic circuit (502, 508, 512) coupled to the display to rotate the image on the display upon activation. In addition, the device has a second display (514) to provide a second image. The wireless communication device also includes a transceiver circuit (506) positioned in the housing to receive an incoming signal via wireless communication so that the display may provide the image based on the incoming signal.

36 Claims, 5 Drawing Sheets

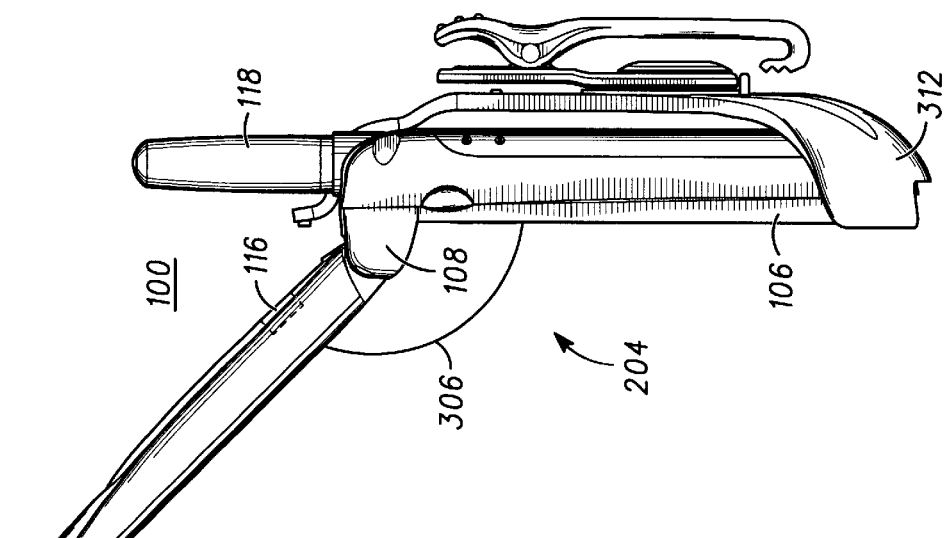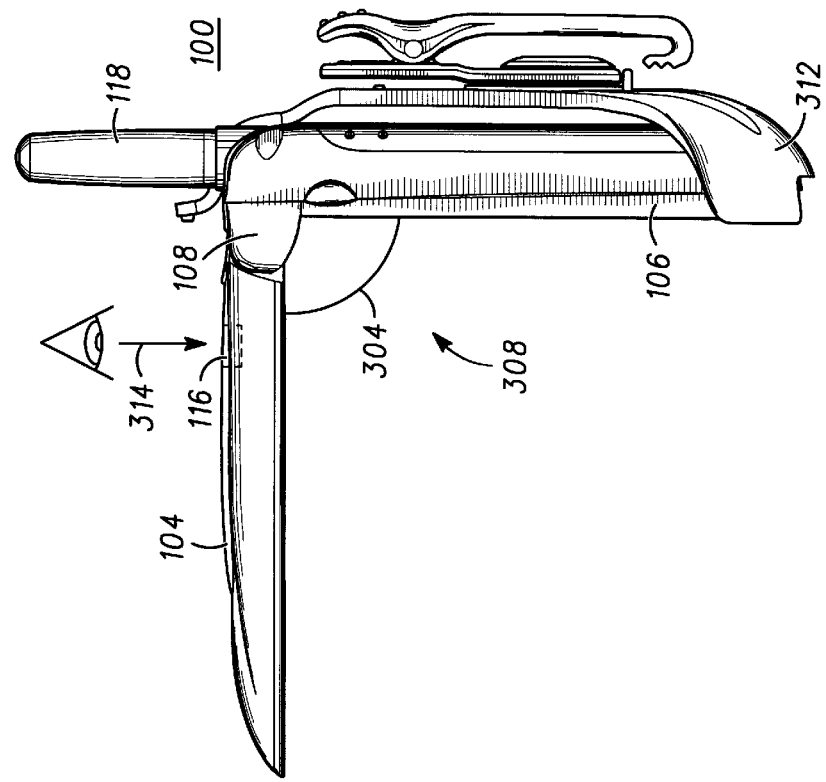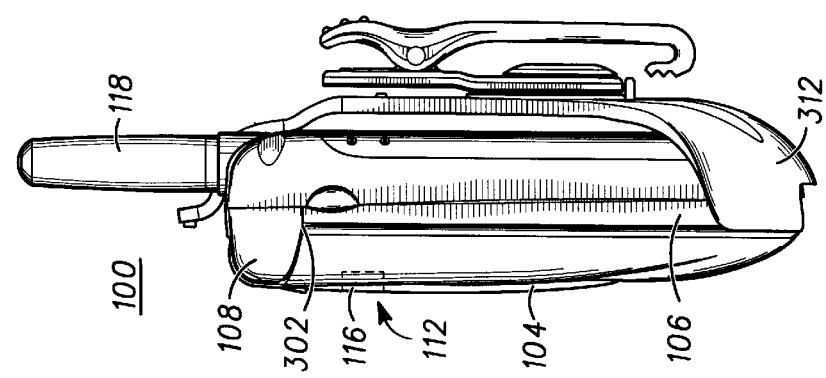

APPARATUS AND METHOD FOR ORIENTING AN IMAGE ON A DISPLAY OF A WIRELESS COMMUNICATION DEVICE

FIELD OF THE INVENTION

The present invention relates generally to the field of control systems and related components for wireless communication devices. More particularly, the present invention relates to electrical and electronic components for controlling one or more displays of a wireless communication device.

BACKGROUND OF THE INVENTION

Wireless communication devices, such as radiotelephones, pagers and personal digital assistants, are often carried by users at the waist. Such devices are supported against one's waist by an attachment accessory, such as a holster or a belt clip. When the device receives a message or call, the user often prefers to view the display of the device to determine the origin of the message or call. For example, a caller identification number such as an originating phone number may be displayed. The user removes the device from the attachment device or detaches the attachment accessory from the waist in order to view the display. Users find this frequent removal of the device or attachment accessory to be cumbersome and annoying.

Pagers and pager accessories that permit a user to view the display of the pager while the device is mounted at one's waist are also known. In general, the pagers have two parts hinged together that permit the user to tilt a display part of the pager upward while a non-display part of the pager remains against the user's waist. The display is located at an inner surface of the display part so that it is hidden between the two parts when the device is closed. When the device is opened, the display of the pager is rotated from a vertical orientation to a horizontal orientation so that the user may view the display by looking down towards his or her waist area. For the pager accessories, the user may flip the entire body of the pager outward so that its display is turned upward toward the user's face. The user may then view the display by looking down towards his or her waist area.

Many wireless communication devices have two displays for viewing operation and status information. Generally, one display provides more specific information than the other display and is provided at a more convenient location for viewing by the user. For example, a foldable radiotelephone may have a display at an inner surface of the phone and a smaller display at an outer surface of the phone. The inner display may be used for general functions of the phone whereas the outer display may be used to view a caller identification number when a call is received. Therefore, the user may view this caller identification number without opening the radiotelephone.

Dual display devices having a foldable design may be positioned against one's waist using a holster or belt clip. The device is preferably held in one's hand and positioned with a holster or belt clip with the antenna directed upward. Unfortunately, the orientation for viewing an external display when the phone is in the user's hand is different from the orientation for viewing the external display when positioned at the user's waist. If the user were to flip open the dual display device to view the external display from his or her waist, i.e. rotate the external display from a vertical orientation to a horizontal orientation, the user will be viewing the external display upside-down.

General purpose monitors, video cameras and radios have dealt with the problem of upside-down viewing of a display. Similar to the wireless communication devices above, these monitors, video cameras and radios have specific orientation requirements that do not permit a user to always view the display at the same orientation. Therefore, the image, i.e. text or graphics, on the display is flipped 180 degrees so that the user does not have to view the image upside down. However, general purpose monitors, video cameras and radios have only dealt with the above problem for equipment having only one display and do not need to provide wireless communication information the display. In other words, these features described above are not adequate for modern wireless communication devices because they do not provide rotated information on a second display that is more conveniently accessible to the user nor do they provide the beneficial and valuable information that may be received by wireless communication.

There is a need for an apparatus and method for orienting an image on a display of a wireless communication device having two or more displays. In particular, a dual display device must be able to orient an image on a conveniently-located display so that a user can view the display while holding it in his or her hand and positioning it against one's waist. There is also a need for an apparatus and method for orienting an image on a display of a wireless communication device in which the image is based on information received via wireless communication. Such information would be particularly helpful to the user and should be oriented for view in the user's hand as well as against the user's waist.

BRIEF DESCRIPTION OF THE DRAWINGS

FIG. 3A is a side planar view of the radiotelephone of FIG. 1 shown in the closed position (corresponding to FIG. 1);

FIG. 3B is a side planar view of the radiotelephone of FIG. 1 shown in a partial opened position;

FIG. 3C is a side planar view of the radiotelephone of FIG. 1 shown in the full opened position (corresponding to FIG. 2);

DETAILED DESCRIPTION OF THE PREFERRED EMBODIMENTS

The present invention is an apparatus and method for orienting an image on a display of a wireless communication device. The device includes a housing, one or more displays positioned on the housing, an electronic circuit coupled to the display or displays, and a receiver circuit positioned in the housing that receives incoming signals via wireless communication. The electronic circuit rotates the image on the display upon activation, and the image may be based on the incoming signals received by the receiver.

Figure 1:
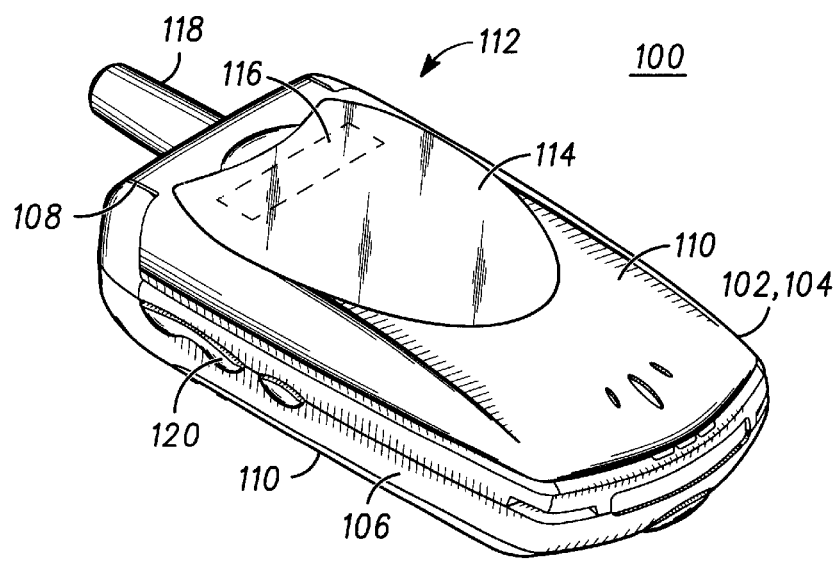
FIG. 1 is a perspective view of the preferred embodiments, namely a radiotelephone, for the present invention shown in a closed position.
Figure 2:
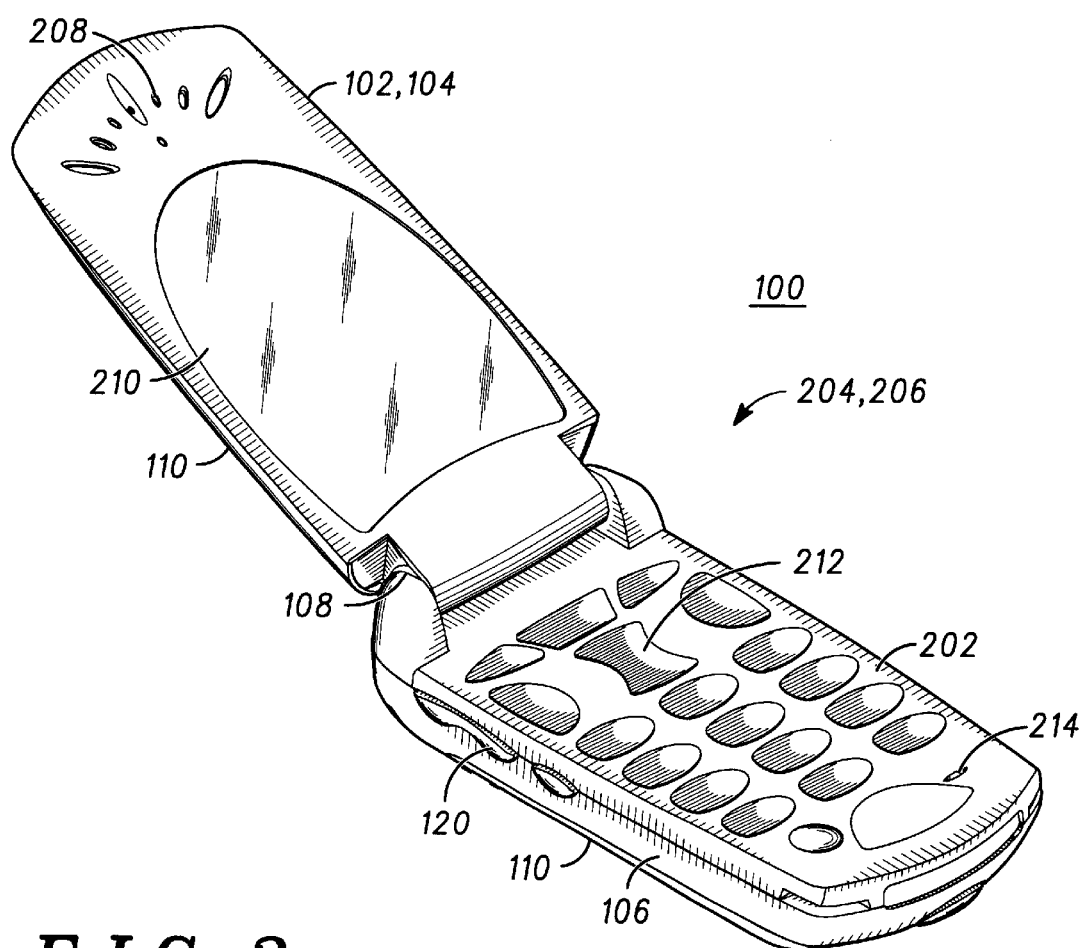
FIG. 2 is a perspective view of the radiotelephone of FIG. 1 shown in a full opened position.

The wireless communication device of the present invention is generally shown in FIGS. 1 & 2 to be a foldable radiotelephone 100, preferably a foldable cellular telephone operable in a cellular telephone system. Although the foldable radiotelephone 100 is preferably a foldable cellular telephone, one skilled in the art will recognize that the features discussed hereinbelow will also find application in other wireless communication devices such as cordless telephones, wireline telephones, personal digital assistants, two-way radios, pagers, and the like, and radiotelephones described herein shall refer to each of these and their equivalents.

The foldable radiotelephone 100 has a housing 102 made up of an upper housing flap 104 and a lower housing flap 106. The upper and lower housing flaps 104 and 106 are moveably joined by a hinge 108. The upper and lower flaps 104 and 106 define an exterior surface 110 and an interior surface 202 of the housing 102. The foldable radiotelephone 100 is moveable between a closed position 112, as shown in FIG. 1, and an opened position 204, as shown in FIG. 2. In the closed position 112, the exterior surface 110 is exposed while the interior surface 202 is hidden from view. In the opened position 204, the exterior and interior surfaces 110 and 202 are exposed. The exterior surface 110 carries an exterior display lens 114 behind which is positioned an exterior display 116 (also shown in FIGS. 3A, 3B, 3C & 5), an antenna 118 and one or more selection buttons 120. The interior surface 202 carries a user interface 206 having speaker apertures 208 behind which is positioned a speaker, an interior display lens 210 behind which is positioned an interior display, a keypad 212 and a microphone aperture 214 behind which is positioned a microphone (shown in FIG. 5).

Periodically, a user places the foldable radiotelephone 100 in the opened position 204 to access the user interface 206 and initiate an outgoing telephone call or receive an incoming telephone call; otherwise, the user keeps the foldable radiotelephone 100 in the closed position 112 to facilitate transport as the length of the foldable radiotelephone 100 in the closed position 112 is approximately one-half the length of the foldable radiotelephone 100 in the opened position 204. For example, in the illustrated embodiment, the foldable radiotelephone 100 has dimensions, in the closed position 112, of approximately 87 mm in length, 45 mm in width and 24 mm in depth.

Referring to FIGS. 3A, 3B and 3C, the foldable radiotelephone 100 may have two or more positions or configurations. To simplify the explanation of these positions, FIGS. 3A, 3B and 3C only show the general structure and elements of the radiotelephone 100 and, thus, do not show all elements of the present invention. As described above the foldable radiotelephone 100 of the present invention includes the upper housing flap 104 and the lower housing flap 106 in which the upper and lower housing flaps are moveably joined by the hinge 108. Thus, the upper housing flap 104 rotates about hinge 108 to form angles 302, 304 & 306 relative to the lower housing flap 106. For the preferred embodiments, the radiotelephone 100 in its closed position 112 as shown in FIG. 3A forms an angle 302 between the upper and lower housing flaps 104 and 106 of between about zero (0) degrees and about fifteen (15) degrees. Similarly, for the preferred embodiments, the radiotelephone 100 in its first or partial opened position 308 as shown in FIG. 3B forms an angle 304 between the upper and lower housing flaps 104 and 106 of between about fifteen (15) degrees and about one hundred twenty (120) degrees, and the radiotelephone in its second or full opened position shown in FIG. 3C forms an angle 306 between the upper and lower housing flaps 104 and 106 of between about one hundred twenty (120) degrees and one hundred and sixty (160) degrees. The angle 306 of the full opened position must be greater than the angle 304 of the partial opened position. For example, for the preferred embodiment shown in FIGS. 3A, 3B & 3C, the angle 302 of the closed position is about zero (0) degrees, the angle 304 of the partial opened position is about ninety (90) degrees and the angle 306 of the full opened position is about one hundred and thirty-five (135) degrees.

Each of the various positions of the foldable radiotelephone 100 provides benefits to the user. The closed position 112 provides a small form factor for convenient storage of the radiotelephone 100 as well as protection for the interior surface 202, particularly the user interface 206, such as the speaker apertures 208, the interior display lens 210, the keypad 212 and the microphone aperture 214 (shown in FIG. 1). The full opened position 204 provides a convenient layout for operating the various input and output components of the radiotelephone 100 as well as an angled contour for positioning the radiotelephone near the user's ear and mouth. In addition, the act of moving the upper housing flap 104 to the full opened position 204 from a different position may also serve to answer or off-hook an incoming call if an "Open-to-Answer" feature of the radiotelephone is activated.

Referring specifically to FIG. 3B, the partial opened position 308 is particularly beneficial for the present invention. As described above, an exterior display 116 is positioned behind the exterior display lens 114 of the radiotelephone's exterior surface 110. When the radiotelephone 100 is positioned against the user's waist by a holster or belt clip 312, the upper housing flap 104 may be positioned at the partial opened position 308 to facilitate viewing of the exterior display by the user in a direction 314 shown in FIG. 3B. The upper housing flap 104 may be held, and continue to be held, at this partial opened position 308 by the user. In the alternative, the radiotelephone 100 may have a detent mechanism (not shown) to maintain the upper housing flap 104 at the partial opened position 308 once situated at this position by the user. In any case, the partial opened position 308 permits the user to view the external display 310 without need for displacing the radiotelephone 100 from his or her waist.

Figure 4B:
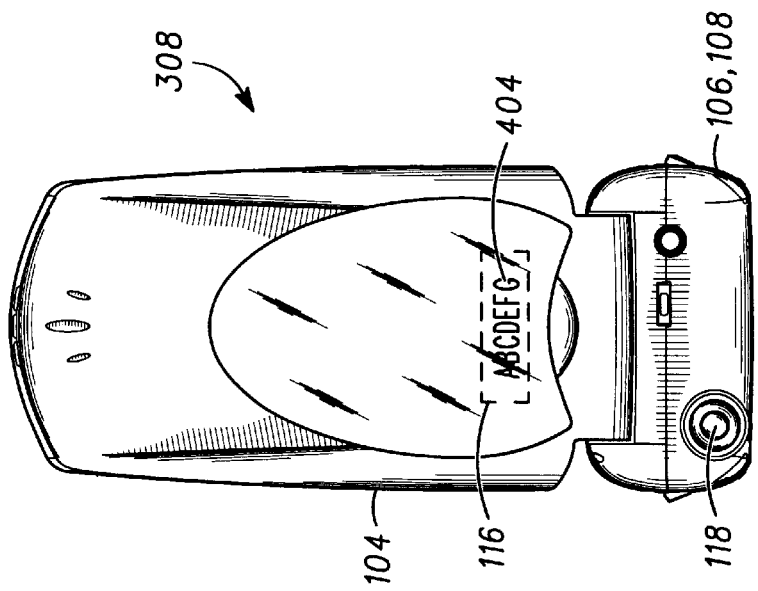
FIG. 4B is a top planar view of the radiotelephone of FIG. 3B shown in the partial opened position.
Figure 4A:
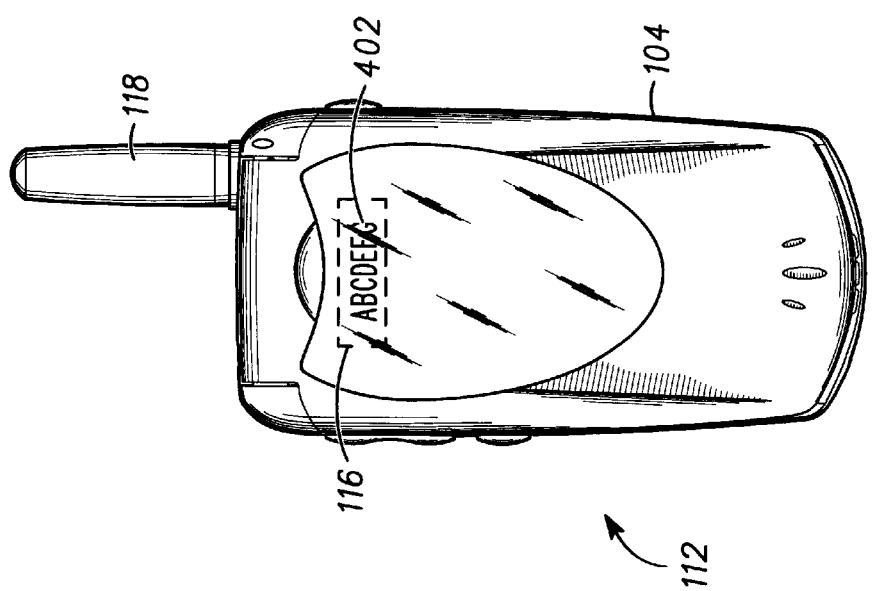
FIG. 4A is a top planar view of the radiotelephone of FIG. 1 shown in the closed position (corresponding to FIG. 1)

Referring to FIGS. 4A and 4B, the external display 116 of the upper housing flap 104 may display images 402 & 404, such as text, graphics and the like, in at least two orientations. FIG. 4A shows the image 402 in a normal or default orientation, whereas FIG. 4B shows the image 404 in an inverted or rotated orientation. FIG. 4A represents the radiotelephone 100 in the closed position 112, as shown in FIGS. 1 and 3A, whereas FIG. 4B represents the radiotelephone in the partial opened position 308, as shown in FIG. 3B. When the radiotelephone 100 is positioned at an opened position, such as the partial opened position 308 and full opened position 204, the image 404 is provided in the rotated orientation as shown in FIG. 4B. When the radiotelephone 100 is positioned at the closed position 112, the image 402 is provided in the default orientation as shown in FIG. 4A. Accordingly, the rotated orientation is used when the radiotelephone 100 is, more than likely, mounted to the user's waist and the upper housing flap 104 has been flipped-up by the user so that the exterior display 116 may be viewed.

Figure 5:
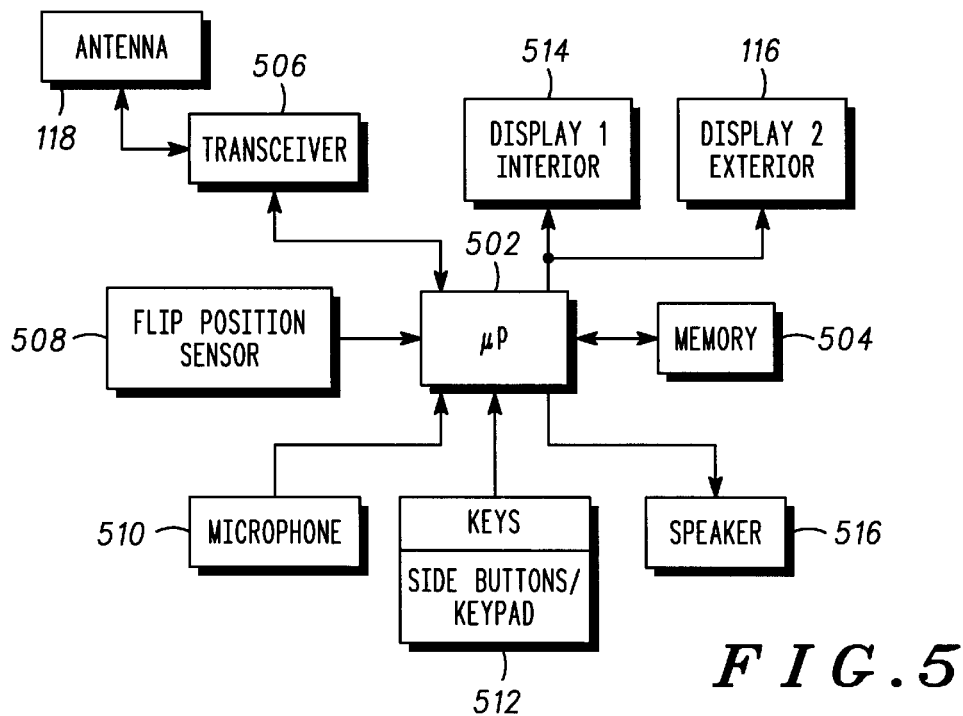
FIG. 5 is a block diagram of the preferred hardware of the present invention of FIG. 1.

Referring to FIG. 5, the radiotelephone 100 includes electronic components or circuits supported by the housing 102 (shown in FIG. 1) and connected to antenna 118. A processor 502, in conjunction with a memory portion 504, generally controls these electronic components and provide primary functions for the radiotelephone. The processor receives information from various input components, such as a transceiver 506, a flip position sensor 508 (such as a Hall effect magnet), a microphone 510, and various keys and buttons 512. The various keys and buttons 512 include the selection buttons 120 (shown in FIG. 1). The processor 502 also provides information to various output components, such as the transceiver 506, the exterior display 116, an internal display 514 and a speaker 516.

Referring to FIG. 5 in conjunction with FIGS. 3A, 3B & 3C, the flip position sensor 508 is a switch that provides information about the closed position 112, the partial opened position 308 and the full opened position 204 of the radiotelephone 100 to the processor 502. In particular, the flip position sensor detects the angular position of the upper housing flap 104 relative to the lower housing flap 106 and generates a position signal. Responsive to this position signal, the flip position sensor and/or the processor 502 determine whether the radiotelephone is in the closed position 112, the partial opened position 308 or the full opened position 204. For example, when an incoming call is detected by the radiotelephone 100, the radiotelephone may be configured to answer the call, i.e. an off-hook condition, at the full opened position 204. The radiotelephone would not answer the call, i.e. an on-hook condition, at the closed position 112 and partial opened position 308. Thus, a user may view the external display 310 in the partial opened position 308 without answering the call.

Referring to FIG. 5 in conjunction with FIGS. 4A & 4B, the processor 502 provides the above information about the position of the radiotelephone 100 to the exterior display 116. If the radiotelephone 100 is in the closed position 112, the image 402 will be provided on the exterior display 116 in the default orientation. Otherwise, when the radiotelephone 100 is in the partial opened position 308 or the full opened position 204, the image 404 will be provided on the exterior display 116 in the rotated orientation. Although any type of information may be provided on the exterior display 116, information via the antenna 118 and transceiver 506 is preferably provided on the exterior display at some point during the operation of the radiotelephone 100. An example of such information includes, but is not restricted to, caller identification information, a.k.a. caller ID.

Figure 6:
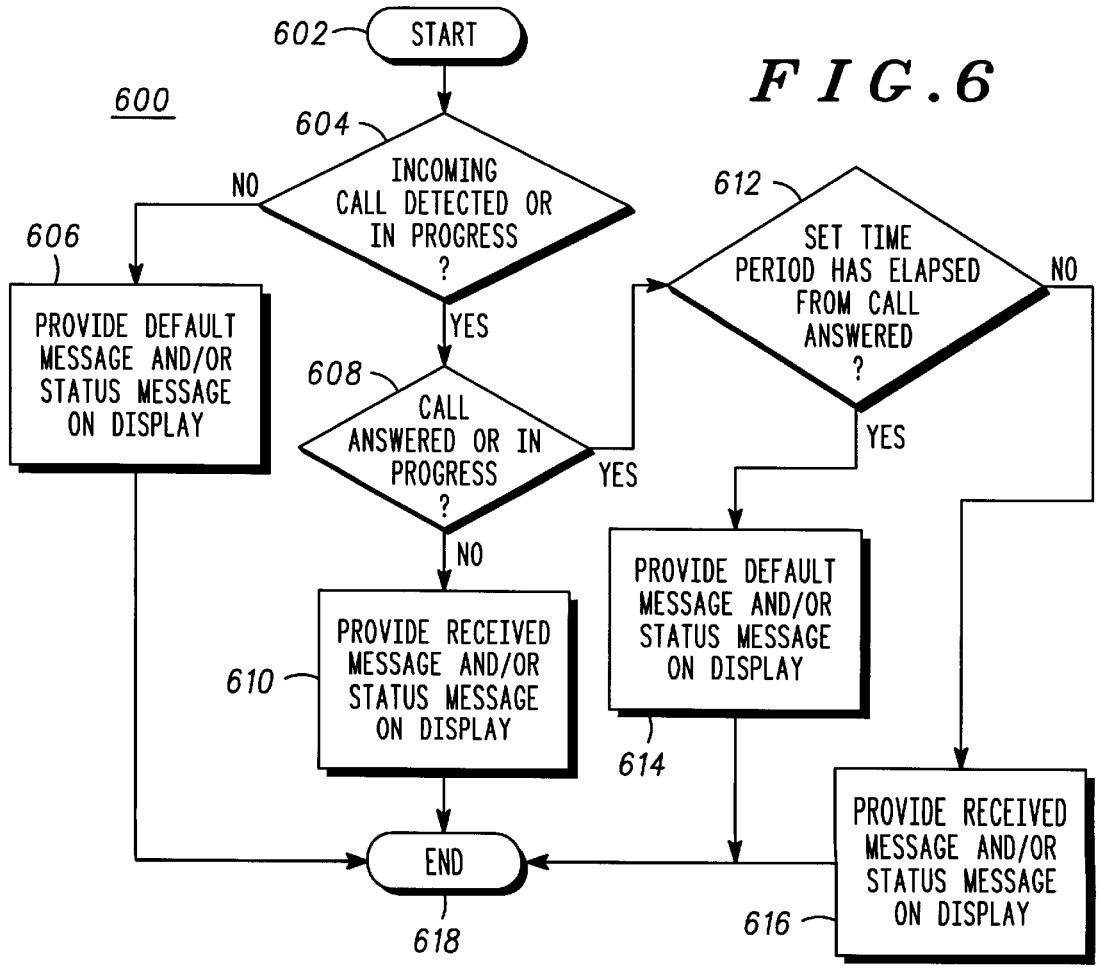
FIG. 6 is a flow diagram for a call procedure of the present invention.
Figure 7:
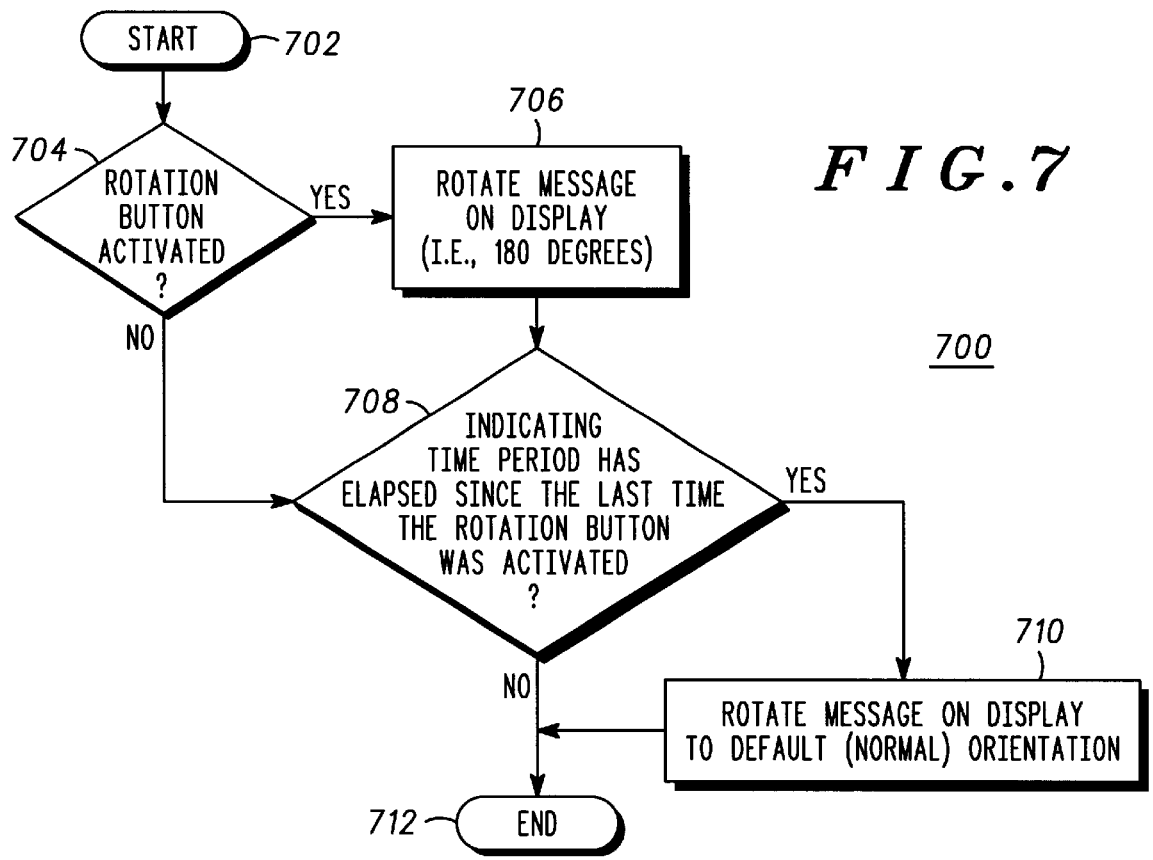
FIG. 7 is a flow diagram for a first preferred embodiment of an inversion procedure of the present invention.
Figure 8:
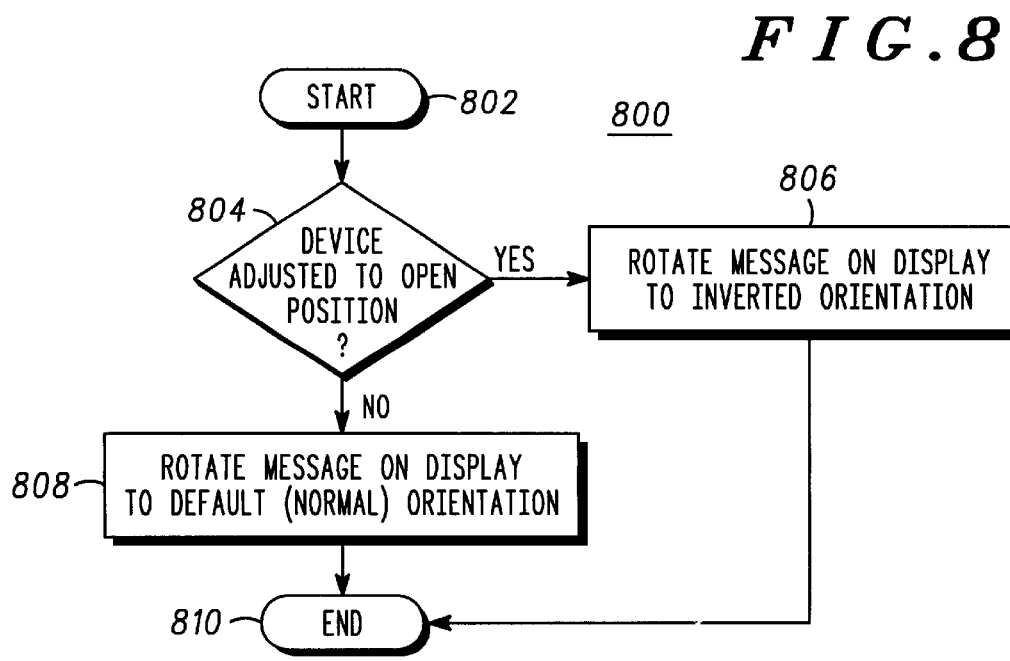
FIG. 8 is a flow diagram for a second preferred embodiment of the inversion procedure of the present invention.

FIGS. 6 though 8 provide flow diagrams for the operation the electronic components shown in FIG. 5. A flow diagram of a Call Procedure 600 is shown in FIG. 6, a flow diagram for an Inversion Procedure 700 for a first preferred embodiment is shown in FIG. 7, and a flow diagram for the Inversion Procedure 800 for a second preferred embodiment is shown in FIG. 8. Each preferred embodiment of the present invention has a main program for running the general operation of the radiotelephone 100. Such main programs typically include an initialization procedure at the beginning, a shutdown procedure at the end, and many different sub-programs or procedures executed therebetween. Generally, wireless communication devices have a processor and a main program for executing the general functions of the device and, thus, such main program is not shown for the present invention. The Call Procedure 600, Inversion Procedure 700 and Inversion Procedure 800 identified-above are procedures that may be called and executed by the main program many times during the operation of the radiotelephone 100. The main program of the radiotelephone 100 sets the priorities for the procedures, and each procedure may be called directly by the main program, in response to an interrupt, upon detection of a change in status (e.g. an incoming call is detected, button is pressed, device is opened/closed, and the like), or in response to polling the components of the radiotelephone.

Referring specifically to FIGS. 5, 6 and 7, the first preferred embodiment of the present invention includes electronic components, such as the components shown in FIG. 5, as well as the Call Procedure 600 and the Inversion Procedure 700. The Call Procedure 600 begins at the START Call Procedure of step 602. In step 604, the processor 502 monitors the signals received from the transceiver 506 to determines whether an incoming call is detected or in progress. If the processor 502 determines that an incoming call is not detected and is not in progress, the processor directs the exterior display 116 to provide a default message and/or a status message on the exterior display as shown in step 606. A wide variety of default messages may be provided on the exterior display 116 including, but not limited to, date information, time information, an identifying label or logo, an identifying banner, battery charge/discharge information, service/no service indications, and messaging information. Similarly, a variety of status messages may be provided on the exterior display 116 including, but not limited to, a "Call In Progress" message and an "In Call" message.

If, in step 604, an incoming call is detected or in progress, then the processor 502 determines whether the incoming call is answered or in progress in step 608. If the processor 502 determines that the incoming call has not been answered and has not been in progress, then the processor directs the exterior display 116 to provide a received message and/or a status message on the exterior display as shown in step 610. The status message is described above in reference to step 606. A variety of received messages may be provided on the exterior display 116 including, but not limited to, caller identification information. Referring again to step 608, if the processor 502 determine that the incoming call has been answered or in progress, then the processor determines whether a set time period has elapsed since the call was last answered in step 612. For the preferred embodiment, this set time period is about five (5) seconds to fifteen (15) seconds. If the processor 502 determines that the set time period has elapsed, then the processor provides a default message and/or status message on the exterior display 116 in step 614. If the set time period has not elapsed, then the processor 502 provides a received message and/or status message on the exterior display 116 in step 616. Therefore, step 614 is similar to step 606, and step 616 is similar to step 610. All four of these messages 606, 610, 614 & 616 continue to the END Call Procedure at step 618.

For security purposes, the radiotelephone 100 may, in the alternative, determine whether to show the received message on the external display 116 in step 616 based on the manner in which an incoming call is answered. In particular, the processor 502 may show the received message on the external display 116 if the incoming call is answered by opening the radiotelephone 100, but the processor 502 may not show the received message on the external display if the incoming call is answered by selecting a button, such as one of the various keys and buttons 512 shown in FIG. 5. If a user selects a button to answer an incoming call, then it is not likely that the user will, thereafter, view the external display 116 in search of the received message. By minimizing the exposure of the received message on the external display 116, the risk of another person viewing the received message on the user's external display is also minimized.

It is to be understood that the above Call Procedure 600 of the radiotelephone 100 determines the message or messages that are provided on the exterior display 116. The interior display 514, on the other hand, may display any type of information that is desired or required for general operation of the radiotelephone 100. For the preferred embodiment, at least a portion of information shown on the exterior display 116 is identical to a corresponding portion of the information shown on the interior display 514. In other words, the image shown on the exterior display 116 may be available on the image shown on the interior display 514 and vice versa. A user may simply view the exterior display 116 to find such information and, thus, avoid the trouble of opening the radiotelephone 100 and viewing the interior display 514.

As stated above, the exterior display 116 may show two messages at the same time. In particular, the exterior display 116 may show the default message and the status message in steps 606 & 614, and the exterior display may show the received message and the status message in steps 610 & 616. In the alternative, the exterior display 116 may only show one message, such as the default message in steps 606 & 614 and the received message in steps 610 & 616, particularly if the exterior display 116 is not large enough to include more than one message. Also, the exterior display 116 may alternately show the default message and the status message in steps 606 & 614 and alternately show the received message and the status message in steps 610 & 616. For example, in step 616, the exterior display 116 may show caller identification information of the calling party for a few seconds, then show an "In-Call" message indicating a call in progress for a few more seconds. Thereafter, the received message and the status message would continue to alternate on the exterior display 116 until conditions change.

Referring to FIGS. 5 and 7, the first preferred embodiment of the present invention implements an Inversion Procedure 700 that begins at step 702. For this Inversion Procedure 700, the user selects a switch or rotation button, such as the various keys and buttons 512 shown in FIG. 5, to rotate the image on the exterior display 116. Preferably, the image is rotated between a default orientation and an inverted orientation. In step 704, the processor 502 determines whether the rotation button has been selected or activated by the user. If the rotation button is selected, then the processor 502 rotates the message or image on the exterior display 116 in step 706. Although the image may be rotated by any angle within the limitations of the exterior display 116, the preferred embodiment rotates the image by one hundred-eighty (180) degrees. The processor 502 will, thereafter, determine whether an indicating time period has elapsed since the last time the rotation button was activated in step 708. In the alternative, the indicating time period may be triggered by the last time the message or image on the exterior display 116 was rotated instead of when the rotation button is activated. For the preferred embodiment, the indicating time period is about fifteen (15) seconds. Referring back to step 704, if the processor determines that the rotation button has not been selected or activated by the user, then the processor goes to step 708 without rotating the image on the exterior display 116.

It is expected that the indicating time period of step 708 is much longer than the time period required to activate the rotation button and rotate the image on the exterior display 116 and, thus, the Inversion Procedure 700 would bypass step 710 and proceed to the END Inversion Procedure at step 712. Therefore, the indicating time period of step 708 is more likely elapse when the rotation button is not selected or activated in step 704 each time the Main Program executes the Inversion Procedure 700 within that indicating time period. If the indicating time period has elapsed, then the processor 502 rotates the message or image on the exterior display 116 to a default or normal orientation in step 710, if the message or image is not already in the default or normal orientation. Thereafter, the Inversion procedure 700 proceeds to the END Inversion Procedure at step 712.

Referring to FIGS. 5 and 8, the second preferred embodiment of the present invention implements a second Inversion Procedure 800 that begins at step 802. The second preferred embodiment is similar to the first preferred embodiment except that the processor 502 monitors the position of the radiotelephone instead of the activation of a rotation button. In step 804 of the second Inversion Procedure 800, the processor 502 uses a switch, such as flip position sensor 508 shown in FIG. 5, to determines whether the radiotelephone 100 has been adjusted from a closed position, such as closed position 112 shown in FIG. 3A, to an opened position, such as partial opened position 308 or full opened position 204 shown in FIGS. 3B and 3C, respectively. If the radiotelephone 100 is opened, then the processor 502 rotates the message or image on the external display 116 to an inverted or rotated orientation in step 806. If the radiotelephone 100 is not adjusted to an opened position or, more specifically, the radiotelephone is in a closed position, then the processor 502 rotates the message or image on the external display 116 to a default or normal orientation in step 808, if the message or image is not already in the default or normal orientation. Thereafter, steps 806 and 808 continue to the END Inversion Procedure at step 810.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A wireless communication device comprising:

a housing;

a first display positioned on said housing, said first display being effective to provide a first image on said first display;

a second display positioned on said housing, said second display being effective to provide a second image on said second display; and an electronic circuit coupled to said first and second displays, said electronic circuit being effective to rotate said first image on said first display upon activation and maintain said second image on said second display, when active, in a default orientation as said electronic circuit rotates said first image.

2. The wireless communication device of claim 1, wherein at least a portion of said first image is identical to a corresponding portion of said second image, said portion of said first image being provided on said first display.

3. The wireless communication device of claim 1, wherein said first image on said first display includes a received message received by said electronic circuit, said received message including caller identification information.

4. The wireless communication device of claim 1, wherein said first image on said first display includes a status message determined by said electronic circuit, said status message including a call-in-progress indication.

5. The wireless communication device of claim 1, wherein said first image on said first display includes a default message provided by said electronic circuit.

6. The wireless communication device of claim 1, wherein said electronic circuit includes a switch, said electronic circuit being effective to rotate said first image on said first display upon activation of said switch.

7. The wireless communication device of claim 6, wherein said switch is an actuation button, said electronic circuit being effective to rotate said first image on said first display upon selection of said actuation button.

8. The wireless communication device of claim 6, wherein:

said housing has a closed position and an opened position; and said switch is a position sensor, said position sensor being effective to generate a position signal when said housing is moved between said closed position and said opened position, and said electronic circuit being effective to rotate said first image on said first display in response to said position signal.

9. The wireless communication device of claim 1, wherein said electronic circuit is capable of alternating said first image between a default position and a rotated position on said first display.

10. The wireless communication device of claim 1, wherein said housing includes a first housing and a second housing movably joined to said first housing.

11. The wireless communication device of claim 1, wherein said housing includes an exterior surface and an interior surface, said exterior surface being exposed and said interior surface being hidden in a closed position of said housing, said first display located on said exterior surface and said second display located on said interior surface.

12. The wireless communication device of claim 1, further comprising an accessory configured to permit said housing to move from a non-viewable position for a user to a viewable position for said user, wherein said first image is rotated on said first display when said housing is moved to the viewable position for said user.

13. The wireless communication device of claim 1, wherein:

said housing has a closed position, an opened position, and a partial opened position between said closed position and said opened position; and said first image is rotated on said first display by the time said housing reaches the partial opened position from said closed position.

14. A wireless communication device for communication with a remote device, said wireless communication device comprising:

a housing;

a receiver circuit positioned in said housing, said receiver circuit being effective to receive an incoming signal via wireless communication;

a first display positioned in said housing, said first display being effective to provide a first image on said first display a second display positioned in said housing, said second display being effective to provide a second image on said second display; and an electronic circuit coupled to said receiver circuit and said first and second displays, said electronic circuit being effective to provide said first image based on said incoming signal on said first display, rotate said first image on said first display upon activation, and maintain said second image on said second display, when active, in a default orientation as said electronic circuit rotates said first image.

15. The wireless communication device of claim 14, further comprising a transmitter circuit for sending an outgoing signal via said wireless communication.

16. The wireless communication device of claim 14, wherein said first image on said first display includes a received message received by said electronic circuit, said received message including caller identification information.

17. The wireless communication device of claim 14, wherein said first image on said first display includes a status message determined by said electronic circuit, said status message including a call-in-progress indication.

18. The wireless communication device of claim 14, wherein said first image on said first display includes a default message provided by said electronic circuit.

19. The wireless communication device of claim 14, wherein said electronic circuit includes a switch, said electronic circuit being effective to rotate said first image on said first display upon activation of said switch.

20. The wireless communication device of claim 19, wherein said switch is an actuation button, said electronic circuit being effective to rotate said first image on said first display upon selection of said actuation button.

21. The wireless communication device of claim 19, wherein:

said housing has a closed position and an opened position; and said switch is a position sensor, said position sensor being effective to generate a position signal when said housing is moved between said closed position and said opened position, and said electronic circuit being effective to rotate said first image on said first display in response to said position signal.

22. The wireless communication device of claim 14, wherein said electronic circuit is capable of alternating said first image between a default position and a rotated position on said display.

23. The wireless communication device of claim 14, wherein said housing includes a first housing and a second housing movably joined to said first housing.

24. The wireless communication device of claim 14, wherein said housing includes an exterior surface and an interior surface, said exterior surface being exposed and said interior surface being hidden in a closed position of said housing, said first display located on said exterior surface and said second display located on said interior surface.

25. The wireless communication device of claim 14, further comprising an accessory configured to permit said housing to move from a non-viewable position for a user to a viewable position for said user, wherein said first image is rotated on said first display when said housing is moved to the viewable position for said user.

26. The wireless communication device of claim 14, wherein:

said housing has a closed position, an opened position, and a partial opened position between said closed position and said opened position; and said first image is rotated on said first display by the time said housing reaches the partial opened position from said closed position.

27. A method for orienting a first image on a first display of a wireless communication device, said device including a second image on a second display, a wireless transceiver and a switch, said method comprising the steps of:

detecting a first activation of said switch;

rotating said first image to a rotated orientation on said first display and maintaining said second image on said second display, when active, in a second default orientation;

detecting a second activation said switch; and rotating said first image to a first default orientation on said first display.

28. The method of claim 27, wherein said step of detecting said first activation includes the step of detecting a selection of an actuation button.

29. The method of claim 28, wherein said step of rotating said first image to said rotated orientation includes the step of rotating said first image on said first display in response to said selection of said actuation button.

30. The method of claim 27, wherein said step of detecting said first activation includes the step of generating a position signal when said device is moved between a closed position and an opened position.

31. The method of claim 30, wherein said step of rotating said first image to said rotated orientation includes the step of rotating said first image on said first display in response to said position signal.

32. The method of claim 27, further comprising the step of setting said first image of said first display to said first default orientation before said step of detecting said first activation.

33. The method of claim 27, further comprising the steps of:

receiving a message via said wireless transceiver;

displaying said message on said second display; and displaying at least a portion of said message on said first display.

34. The method of claim 27, further comprising the step of determining a status message and displaying at least a portion of said status message on said first display.

35. The method of claim 27, further comprising the step of providing a default message on said first display.

36. The method of claim 27, further comprising the step of alternating said first image on said first display between said first default orientation and said rotated orientation.

* * * * *